United States Patent
Ahuja (10) Patent No.: US 10,359,998 B2
(45) Date of Patent: Jul. 23, 2019

(54) RUNSTREAM GENERATOR

(71) Applicant: Gaurav Ahuja, Manchester (GB)

(72) Inventor: Gaurav Ahuja, Manchester (GB)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 15/186,684

(22) Filed: Jun. 20, 2016

(65) Prior Publication Data
US 2017/0322780 A1    Nov. 9, 2017

(51) Int. Cl.
    *G06F 9/44*    (2018.01)
    *G06F 8/30*    (2018.01)

(52) U.S. Cl.
    CPC ..................... *G06F 8/30* (2013.01)

(58) Field of Classification Search
    None
    See application file for complete search history.

(56) References Cited

U.S. PATENT DOCUMENTS

| | | | | |
|---|---|---|---|---|
| 6,189,144 | B1* | 2/2001 | Weber | G06F 8/54 717/162 |
| 7,945,581 | B2* | 5/2011 | Bayliss | G06F 17/30445 707/770 |
| 2003/0018694 | A1* | 1/2003 | Chen | G06F 8/60 709/200 |
| 2011/0093837 | A1* | 4/2011 | Guenthner | G06F 8/45 717/149 |

* cited by examiner

*Primary Examiner* — Qamrun Nahar (57) ABSTRACT

Systems and methods that include receiving a plurality of programs, wherein each of the plurality of programs performs at least one function. The systems and methods further include parsing the plurality of programs. The systems and methods further include generating control statements configured to create an executable file. The executable file is configured to perform the functions performed by the plurality of programs.

13 Claims, 9 Drawing Sheets

RUNSTREAM GENERATOR

FIELD OF THE DISCLOSURE

The instant disclosure relates generally to operating systems. More specifically, this disclosure relates to methods, apparatuses, and systems that simplify the process to create new executable file performing various functions for operating systems.

BACKGROUND

Operating systems have complex control statements. The complexity of the control statements makes creating new executable file performing various functions systems difficult. For example, OS 2200 operating system have more than forty control statements. Each control statement may have tens of variations resulting from various control options and input parameters. Thus, the complexity of the control statements makes creating new functions for the OS 2200 difficult. The embodiments disclosed herein may provide alternative solutions that simplify the process to create new executable file performing various functions for operating systems.

SUMMARY

The instant disclosure relates generally to operating systems. More specifically, this disclosure relates to methods, apparatuses, and systems that simplify the process to create new executable file performing various functions for operating systems. According to one embodiment, a method includes receiving, at a processor, a plurality of programs, wherein each of the plurality of programs performs at least one function. The method further includes parsing, by the processor, the plurality of programs. The method further includes generating, by the processor, control statements configured to create an executable file. The executable file is configured to perform the functions performed by the plurality of programs.

According to another embodiment, a computer program product includes a non-transitory computer-readable medium comprising instructions which, when executed by a processor of a computing system, cause the processor to perform the following steps. The steps include receiving a plurality of programs, wherein each of the plurality of programs performs at least one function. The steps include parsing the plurality of programs. The steps further include generating control statements configured to create an executable file, wherein the executable file is configured to perform the functions performed by the plurality of programs.

According to yet another embodiment, an apparatus includes a memory. The apparatus further includes a processor coupled to the memory. The processor is configured to execute the following steps. The steps include receiving a plurality of programs, wherein each of the plurality of programs performs at least one function. The steps include parsing the plurality of programs. The steps include generating control statements configured to create an executable file. The executable file is configured to perform the functions performed by the plurality of programs.

The foregoing has outlined rather broadly the features and technical advantages of the present invention in order that the detailed description of the invention that hollows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

DETAILED DESCRIPTION

The term "operating system" is a set of instructions that can be executed by a processor of a computer. An operating system supports the basic functionalities of a computer. An operating system may be an emulated operating system or a non-emulated operating system, for example, OS 2200, Eclipse 2200, System Architecture Interface Layer (SAIL), Linux, Windows, Java, Unix, or the like.

The term "instruction" means a processor-executable instruction, for example, an instruction written as programming codes. An instruction may be executed by any suitable processor, for example, x86 processor. An instruction may be programmed in any suitable computer language, for example, machine codes, assembly language codes, C language codes, C language codes, Fortran codes, Java codes, Matlab codes, or the like.

A "computer-readable medium" holds the data in the data storage medium for a period of time that is not transient. The term computer-readable medium may be used interchangeably with non-transient computer-readable medium. A computer-readable medium may be volatile memory that lost its memory when power is off, e.g., random access memory (RAM), etc. A computer-readable medium may be non-volatile memory that does not lost its memory when power is off, e.g, hard disk, flash memory, etc. Computer-readable medium includes, e.g., random access memory (RAM), dynamic random access memory (DRAM), read only memory (ROM), electrically erasable programmable read-only memory (EEPROM), Flash memory, NAND/NOR gate memory, hard disk drive, magnetic tape, optical disk, compact disk (CD), or the like.

The term "control statement" means an interfacing language an user may make to request a processor of a computer to perform certain functions. In one embodiment, a control statement may be an instruction. In one embodiment, control statements may include Executive Control Language (ECL) control statements, File Utility Routine/Program File Utility Routine (FURFUR) control statements, processor call control statements, unformatted processor call control statements, or the like.

An "ECL statement" is an interfacing language between an user and the operating system of OS 2200 and/or Eclipse 2200. An user may use an ECL statement to request a processor executing OS 2200 and/or Eclipse 2200 to perform certain functions. An ECL statement allows an user of OS 2200 and/or Eclipse 2200 to control a batch run, create a storage space on a computer readable medium, assign a storage space to a specific file, write and/or delete certain information on a computer readable medium, control the input/output ports of a computer, generate executable files, send messages to a system console and other terminals connected in a data network, or the like.

A "runstream" is a collection of control statements that can be sequentially processed by a computer processor, e.g. a central processing unit (CPU). In one embodiment, a runstream is a collection of ECL control statements that can be processed by a processor of a computer running OS 2200 and/or Eclipse 2200.

An "executable file" means a runstream packaged in one file. In one embodiment, an executable file may include the functions of a plurality of batch programs.

The term "buildstream" is a runstream that is used for building, compiling, and/or linking control statements to form an executable file, e.g., an object module, an .exe file.

The term "program" is a collection of control statements.

The term "batch program" is a "program" that can instruct a processor of a computer to perform a series of functions without user interaction. In one embodiment, a batch program includes all the necessary input and output information, so that the batch program can be run without prompting an user for inputting any information.

A "session" or a "run" is a session that the user has logged in, e.g., a run of OS 2200. A session or a run can be performed in an emulated or non-emulated operating system. The buildstream or runstream may be executed in an established "session" or "run."

For a more complete understanding of the disclosed systems and methods, reference is now made to the following descriptions taken in conjunction with the accompanying drawings.

Figure 1:
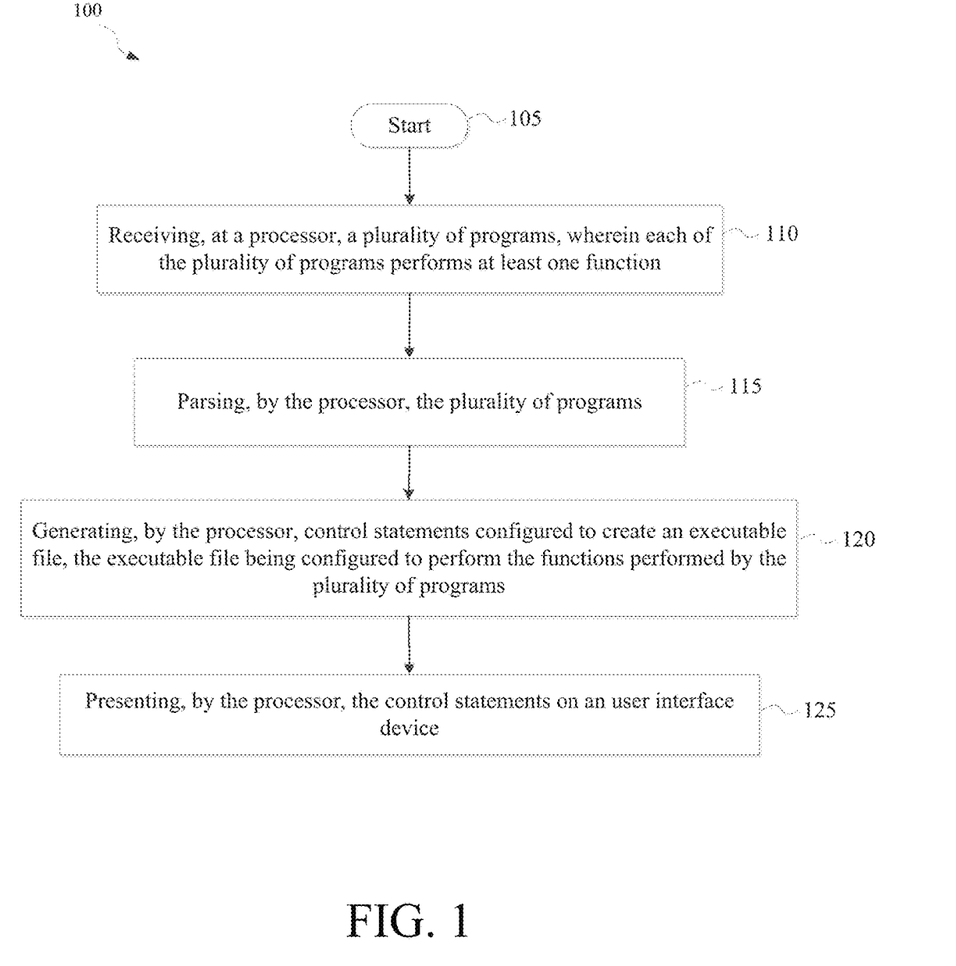
FIG. 1 is a flow chart illustrating a method to create an executable file and/or a runstream according to one embodiment of the disclosure.
Figure 6:
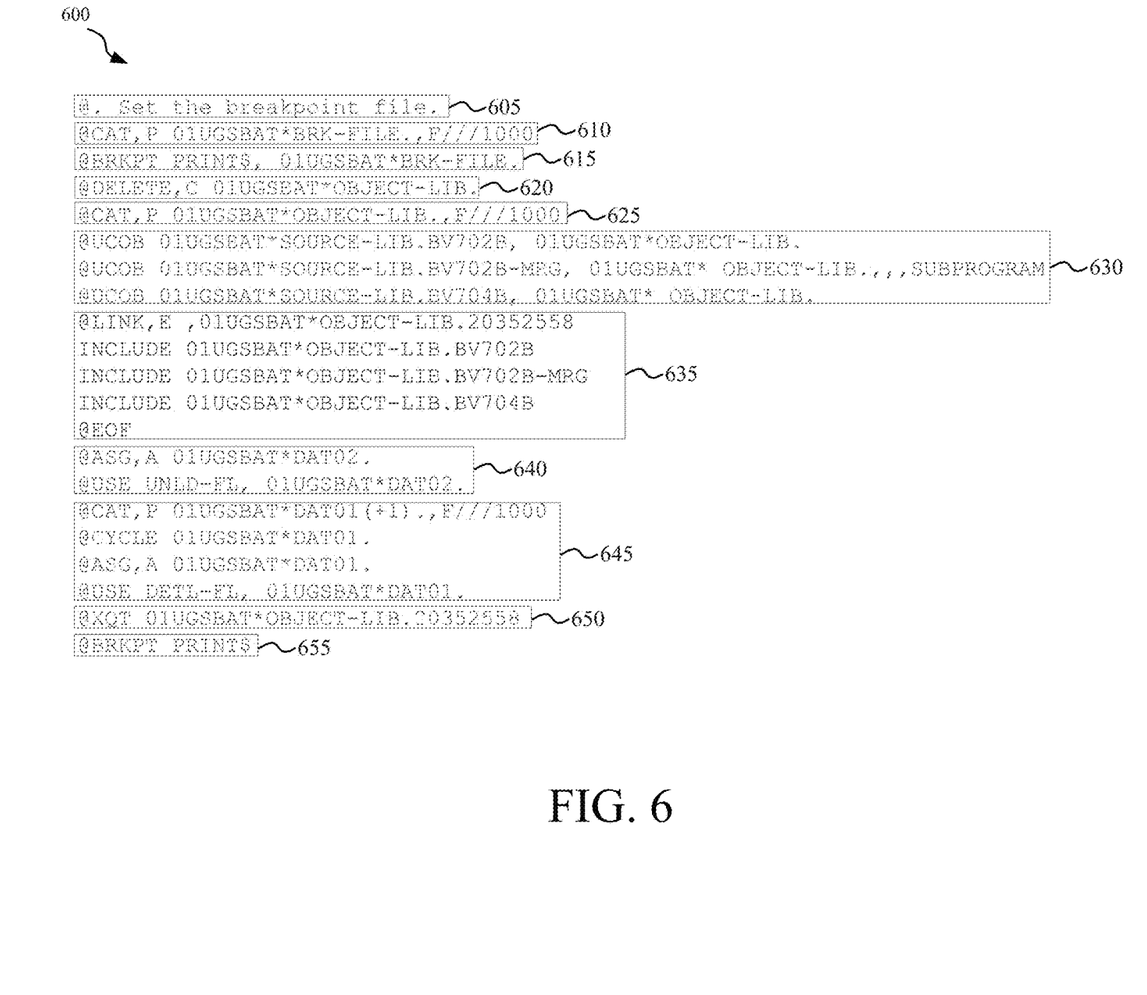
FIG. 6 is an example of control statements according to one embodiment of the disclosure.
Figure 7:
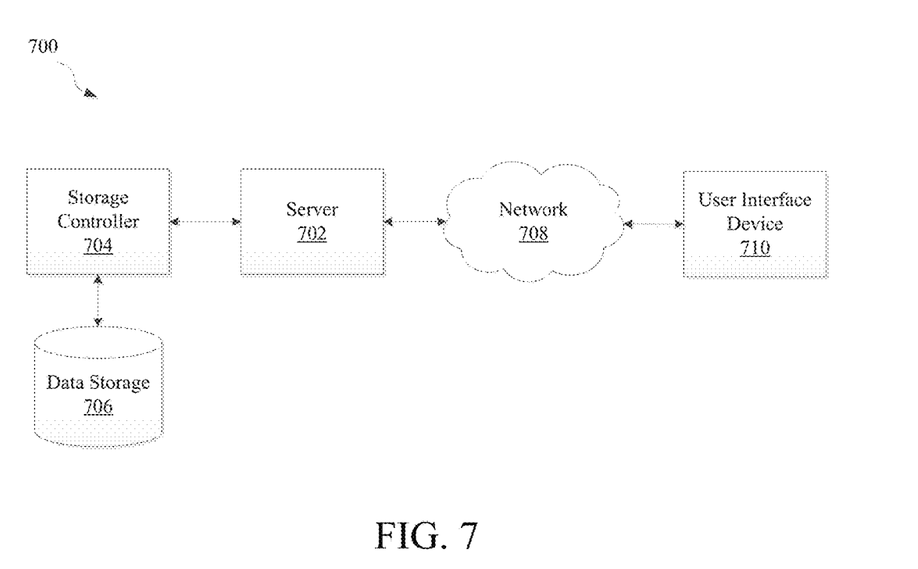
FIG. 7 is a block diagram illustrating a system according to one embodiment of the disclosure according to one embodiment of the disclosure.
Figure 8:
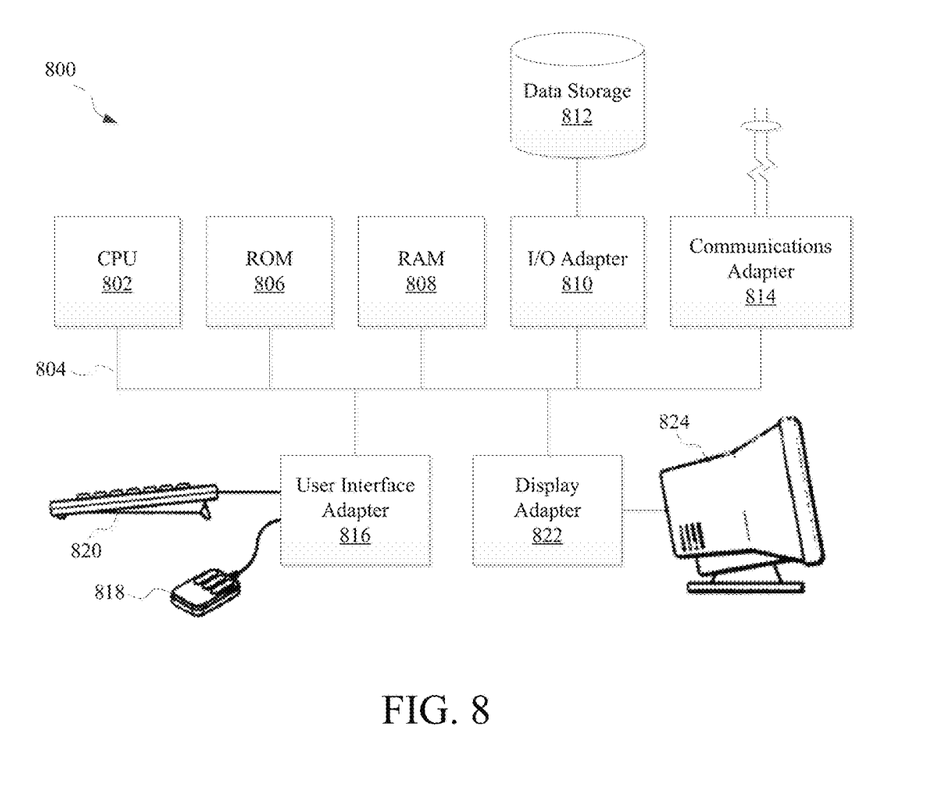
FIG. 8 is a block diagram illustrating a computer system according to one embodiment of the disclosure.
Figure 9A:
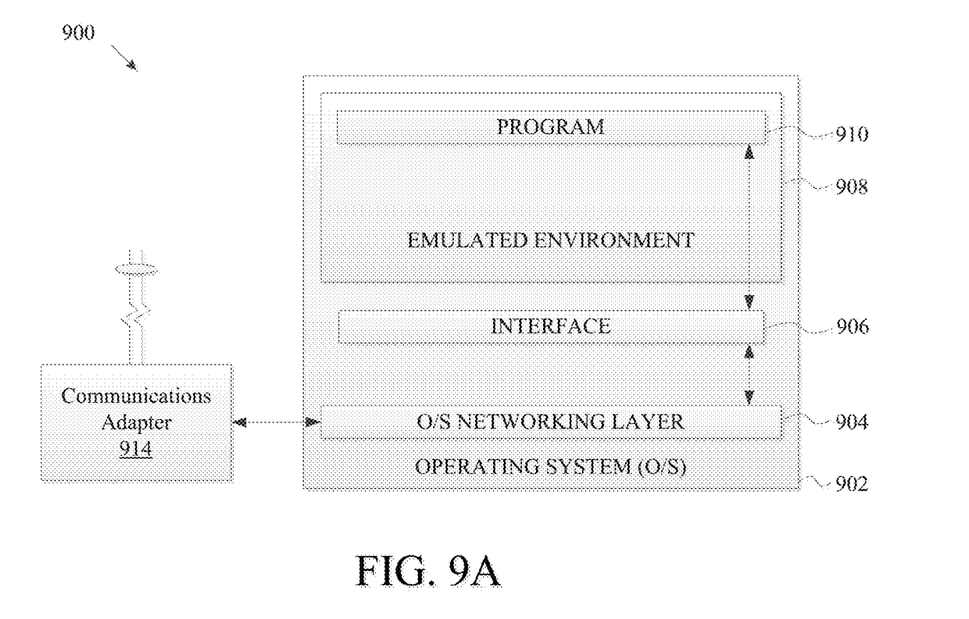
FIG. 9A is a block diagram illustrating a server hosting an emulated software environment for virtualization according to one embodiment of the disclosure.
Figure 9B:
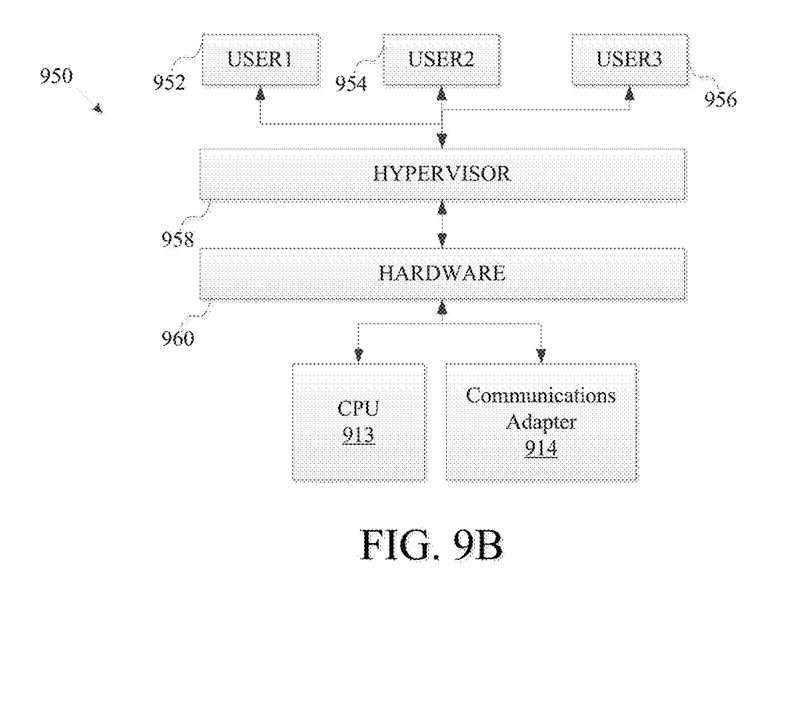
FIG. 9B is a block diagram illustrating a server hosing an emulated hardware environment according to one embodiment of the disclosure.

FIG. 1 is a flow chart illustrating a method 100 to create an executable file and/or a runstream according to one embodiment of the disclosure. The method 100 can be used as part or in combination with the method 200 in FIG. 2. The method 100 can be used as part or in combination with the method 300 in FIG. 3. The method 100 can include the example 400 in FIG. 4. For example, without limitation, the step 110 of the method 100 may include example 400 in FIG. 4. The method 100 can include the example 500 in FIG. 5. For example, without limitation, the step 115 of the method 100 may include example 500 in FIG. 5. The method 100 can include the example 600 in FIG. 6. For example, without limitation, the steps 120 and/or 125 of the method 100 may include example 600 in FIG. 6. The method 100 can be implemented in the system 700 as shown in FIG. 7. For example, without limitation, the control statements in method 100 may be stored in the data storage 706 or displayed on the user interface device 710. The method 100 can be implemented in the computer system 800 as shown in FIG. 8. For example, without limitation, the control statements in method 100 may be executed by the CPU 802 as shown in FIG. 8. The method 100 can be implemented on the servers 900 and 950 as shown in FIGS. 9A and 9B. For example, without limitation, the control statements in method 100 may be generated in the emulated environment 908 in as shown in FIG. 9A or executed by the CPU 913 as shown in FIG. 9B.

As shown in FIG. 1, the method 100 starts at block 105. The method 100 proceeds to block 110, which includes receiving, at a processor, a plurality of programs, wherein each of the plurality of programs performs at least one function. The method proceeds to block 115, which includes parsing, by the processor, the plurality of programs. The method proceeds to block 120, which includes generating, by the processor, control statements configured to create an executable file, the executable file being configured to perform the functions performed by the plurality of programs. The method proceeds to block 125, which includes generating, by the processor the control statements on an user interface device.

At block 110, in one embodiment, a processor may receive a plurality of programs. Each program may perform one or more functions. In one embodiment, the functions performed by the plurality of programs may include, without limitation, reading, writing, deleting, duplicating, moving, processing, or the like, information in a database. In one embodiment, the database may be operated in an emulated operating system, e.g., OS 2200. At block 110, in one embodiment, the program received at the processor may be manually selected by a user. In another embodiment, the program received at the processor may be automatically assigned by an instruction or control statement.

At block 115, in one embodiment, the processor may parse the plurality of programs to extract information that may be useful to build the executable file and/or runstream. In one embodiment, block 115 may include identifying the programming languages used in the plurality of programs. In some embodiments, the programming language may include COBOL, C, C++, etc. In one embodiment, the C language used in a program may be identified by the keywords "#INCLUDE." In one embodiment, the COBOL language used in a program may be identified by the keywords "IDENTIFICATION DIVISION."

In another embodiment, block 115 may include identifying program types of the plurality of programs, e.g., main program, subprogram, etc. In one embodiment, when the programming language is C, whether the program is a main program or subprogram can be identified by keyword "main." In one embodiment, when the programming language is COBOL, whether the program is a main program or subprogram can be identified by the information in the "LINKAGE SECTION" in the program. Example 500 shown in FIG. 5 may be an exemplary embodiment.

In yet another embodiment, block 115 may include extracting input and/or output information from the plurality of programs. In one embodiment, when the programming language is COBOL, the input and/or output information may be extracted from a "FILE-CONTROL" paragraph of the "INPUT-OUTPUT SECTION."

At block 120, in one embodiment, the processor may generate control statements configured to create an executable file. In one embodiment, the executable file may perform a part of the functions performed by the programs. In another embodiment, the executable file may perform all of the functions performed by the programs. In yet another embodiment, the executable file may perform functions other than the functions performed by the programs.

At block 120, in one embodiment, the processor may generate the control statement by using an appropriate compiler that matches the language used in the program. In one embodiment, if the programming language is COBOL, the compiler "@UCOB" is called. In another embodiment, if the programming language is C, the compiler "@UC" is called. In yet another embodiment, if the programming language is FORTRAN, the compiler "@UFTN" is called.

At block 120, in one embodiment, the processor may call files based on the program-name and program type understood by the specific compiler. In one embodiment, if the language is COBOL, the processor may use control statement as @UCOB <SOURCE-FILE>.ELEMENT,<OBJECT-FILE>.,,, <SUBPROGRAM>. In this control statement "@UCOB" may represent the COBOL compiler. "SOURCE-FILE" may be the file where the program exists, for example a work file that exists in a project of OS 2200. "ELEMENT" may be the program being compiled. "OBJECT-FILE" may be the file where the object module generated by the @UCOB complier call for the source-program would be stored. "SUBPROGRAM" may be the keyword that needs to be specified for the subprograms. In one embodiment, the control statements calling for compilers and files may be control statements 630 as shown in FIG. 6.

At block 120, in one embodiment, after the programs are compiled, the processor may further link them together. In one embodiment, the control statements would be the followings:

@LINK,E,<OBJECT-FILE>.<DATE-TIME>

INCLUDE<OBJECT-FILE>.<OBJECT1>

INCLUDE<OBJECT-FILE>.<OBJECT2>

. . .

INCLUDE<OBJECT-FILE>.<OBJECTn>

@EOF

"OBJECT-FILE" may be the file where all the object modules have been stored by the processor. "OBJECT1" through "OBJECTn" may be various objects generated ruing the compilation. "DATE-TIME" may be the resultant object module and may be the packaged executable file including all the object modules OBJECT1 through OBJECTn. In one embodiment, the DATE-TIME may be limited to 12 characters, e.g., if the method 100 is run in a OS 2200 project. In another embodiment, the resulting linking control statements may be the control statements 635 shown in FIG. 6.

At block 120, in one embodiment, the processor may call, catalogue, and assign an output file. In one embodiment, the processor may generate the following control statements:

@CAT,P QUAL*FILE(+1).,F///1000

@CYCLE QUAL*FILE.

@ASG,a QUAL*FILE.

@USE <INTERNAL-FILE-NAME>, QUAL*FILE.

"QUAL*FILE" may be a data file name to be catalogued in an operating system, e.g., OS 2200 system. "@CAT,P QUAL*FILE(+1).,F///1000" may create a new cycle for public file with the file name of "QUAL*FILE" and with the size as 1000 tracks. "@CYCLE" may provide the cycle information for the user. "@ASG,A" may assign a newly catalogued file to the session. "@USE" may set an alias name for the newly catalogued file. "INTERNAL-FILE-NAME" may be the name of the output file extracted in the one of the selected program in the step of parsing the programs. In one embodiment, the processor may generate the control statements 645 shown in FIG. 6.

At block 120, in one embodiment, the processor may assign and use an input file. In one embodiment, the processor may generate the following control statements:

@ASG,A QUAL*FILE.

@USE <INTERNAL-FILE-NAME>, QUAL*FILE

"QUAL*FILE" may be the data file name, which already exists in an operating system, e.g., OS 2200. "@ASG" may assign the file to the session. "@USE" may set an alias name for the file. "INTERNAL-FILE-NAME" may be the input file. In one embodiment, the processor may generate control statements 640 as shown in FIG. 6.

It is noted that the above control statements, file names, and parameters described in FIG. 1 are exemplary only and are in no way limiting the true scope of the invention defined in the claims.

Figure 2:
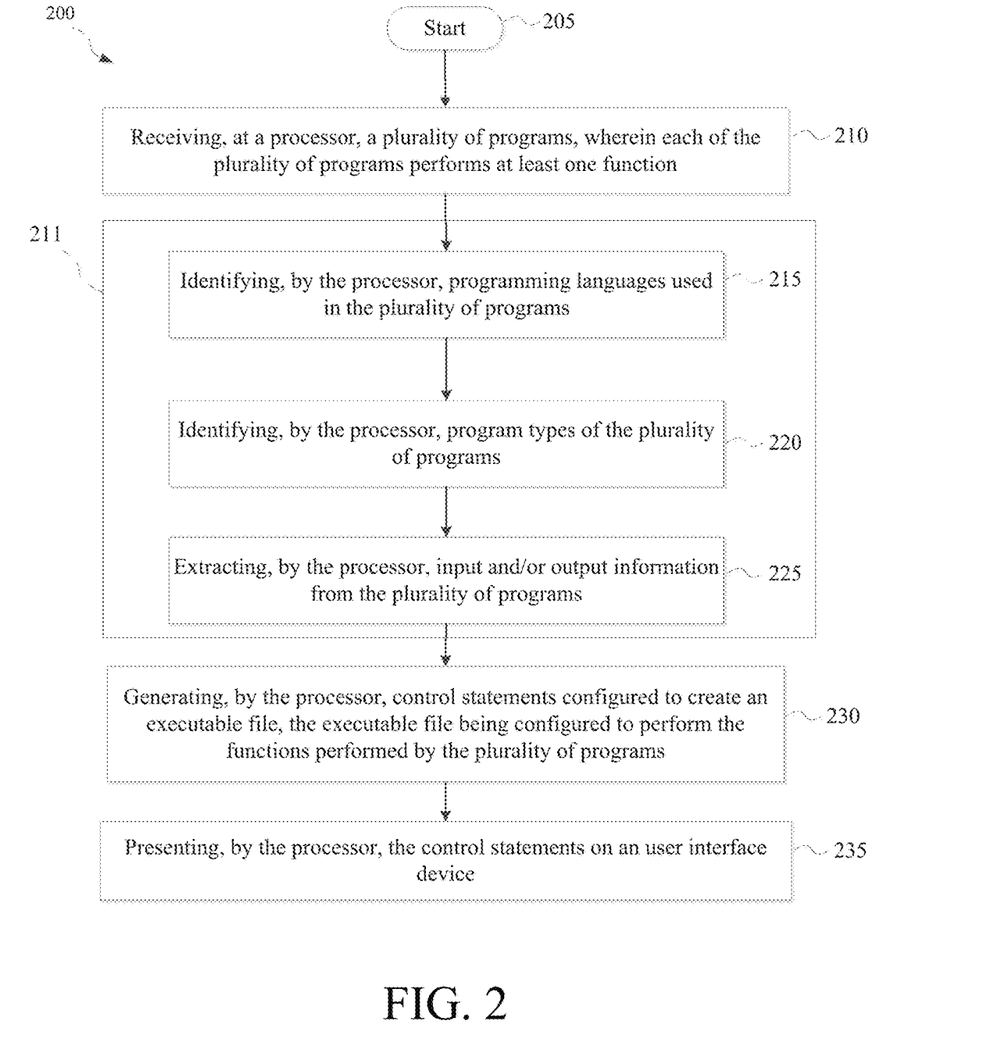
FIG. 2 is a flow chart illustrating a method to create an executable file and/or a runstream according to one embodiment of the disclosure.

FIG. 2 is a flow chart illustrating a method 200 to create an executable file and/or a runstream according to one embodiment of the disclosure. The method 200 can be used as part or in combination with the method 100 in FIG. 1. The method 200 can be used as part or in combination with the method 300 in FIG. 3. The method 200 can include the example 400 in FIG. 4. For example, without limitation, the step 210 of the method 200 may include example 400 in FIG. 4. The method 200 can include the example 500 in FIG. 5. For example, without limitation, the step 211 of the method 200 may include example 500 in FIG. 5. The method 200 can include the example 600 in FIG. 6. For example, without limitation, the steps 230 and/or 235 of the method 200 may include example 600 in FIG. 6. The method 200 can be implemented in the system 700 as shown in FIG. 7. For example, without limitation, the control statements in method 200 may be stored in the data storage 706 or displayed on the user interface device 710. The method 200 can be implemented in the computer system 800 as shown in FIG. 8. For example, without limitation, the control statements in method 200 may be executed by the CPU 802 as shown in FIG. 8. The method 200 can be implemented on the servers 900 and 950 as shown in FIGS. 9A and 9B. For example, without limitation, the control statements in method 200 may be generated in the emulated environment 908 in as shown in FIG. 9A or executed by the CPU 913 as shown in FIG. 9B.

As shown in FIG. 2, the method 200 starts at block 205. The method 200 proceeds to block 210, which includes receiving, at a processor, a plurality of programs, wherein each of the plurality of programs performs at least one function. The method 200 proceeds to block 211, which includes parsing, by the processor, the plurality of programs. The block 211 includes block 215, which includes identifying, by the processor, programming languages used in the plurality of programs. The block 211 includes block 220, which includes identifying, by the processor, program types of the plurality of programs. The block 211 also includes block 225, which includes extracting, by the processor, input and/or output information from the plurality of programs. The method 200 proceeds to block 230, which includes generating, by the processor, control statements configured to create an executable file, wherein the executable file is configured to perform the functions performed by the plurality of programs. The method 200 proceeds to block 235, which includes presenting, by the processor, the control statements on an user interface device.

In one embodiment, the block 210 may include all embodiments and their equivalents disclosed for the block 110 in FIG. 1. In one embodiment, the block 211 may include all embodiments and their equivalents disclosed for the block 115 in FIG. 1. In one embodiment, the block 230 may include all embodiments and their equivalents disclosed for the block 120 in FIG. 1. In one embodiment, the block 230 may include all embodiments and their equivalents disclosed for the block 125 in FIG. 1.

Figure 3:
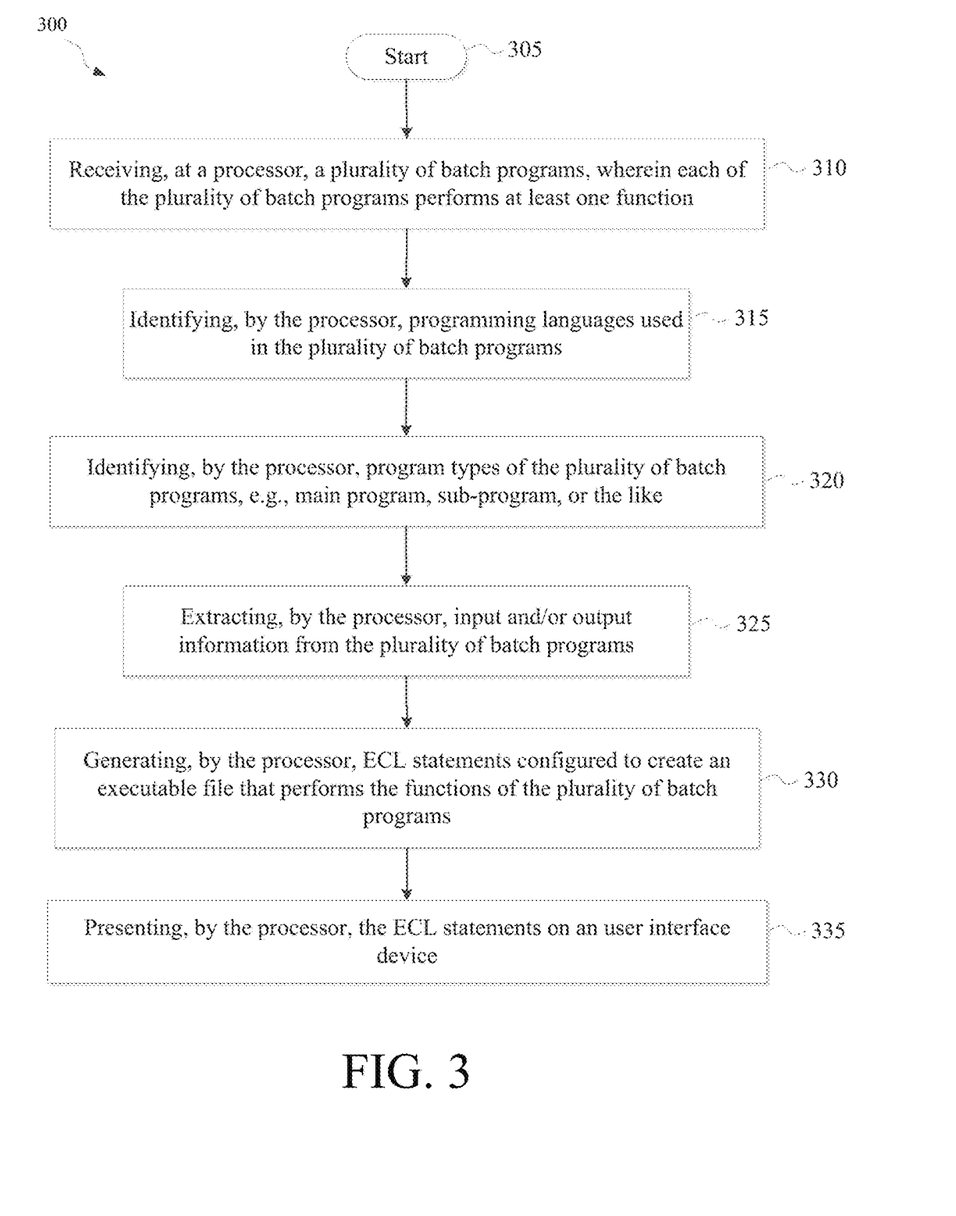
FIG. 3 is a flow chart illustrating a method to create an executable file and/or a runstream according to one embodiment of the disclosure.

FIG. 3 is a flow chart, illustrating a method 300 to create an executable file and/or a runstream according to one embodiment of the disclosure. The method 300 can be used as part or in combination with the method 200 in FIG. 2. The method 300 can be used as part or in combination with the method 200 in FIG. 2. The method 300 can include the example 400 in FIG. 4. For example, without limitation, the step 310 of the method 100 may include example 400 in FIG. 4. The method 300 can include the example 500 in FIG. 5. For example, without limitation, the step 325 of the method 300 may include example 500 in FIG. 5. The method 300 can include the example 600 in FIG. 6. For example, without limitation, the steps 330 and/or 335 of the method 300 may include example 600 in FIG. 6. The method 300 can be implemented in the system 700 as shown in FIG. 7. For example, without limitation, the control statements in method 300 may be stored in the data storage 706 or displayed on the user interface device 710. The method 300 can be implemented in the computer system 800 as shown in FIG. 8. For example, without limitation, the control statements in method 300 may be executed by the CPU 802 as shown in FIG. 8. The method 300 can be implemented on the servers 900 and 950 as shown in FIGS. 9A and 9B. For example, without limitation, the control statements in method 300 may be generated in the emulated environment 908 in as shown in FIG. 9A or executed by the CPU 913 as shown in FIG. 9B.

As shown in FIG. 3, the method 300 starts at block 305. The method 300 proceeds to block 310, which includes receiving, at a processor, a plurality of batch programs, wherein each of the plurality of batch programs performs at least one function. The method 300 proceeds to block 315, which includes identifying, by the processor, programming languages used in the plurality of programs. The method 300 proceeds to block 320, which includes identifying, by the processor, program types of the plurality of batch programs, e.g., main program, sub-program, or the like. The method 300 proceeds to block 325, which includes extracting, by the processor, input and/or output information from the plurality of batch programs. The method 300 proceeds to block 330, which includes generating, by the processor, statements configured to create an executable file, wherein the executable file is configured to perform the functions performed by the plurality of batch programs. The method 300 proceeds to block 335, which includes presenting, by the processor, the ECL statements on an user interface device.

In one embodiment, the block 310 may include all embodiments and their equivalents disclosed for the block 110 in FIG. 1. In one embodiment, the block 315 may include some of the embodiments and their equivalents disclosed for the block 115 in FIG. 1. In one embodiment, the block 320 may include some of the embodiments and their equivalents disclosed for the block 115 in FIG. 1. In one embodiment, the block 325 may include some of the embodiments and their equivalents disclosed for the block 115 in FIG. 1. In one embodiment, the block 330 may include all embodiments and their equivalents disclosed for the block 120 in FIG. 1. In one embodiment, the block 335 may include all embodiments and their equivalents disclosed for the block 125 in FIG. 1.

Figure 4:
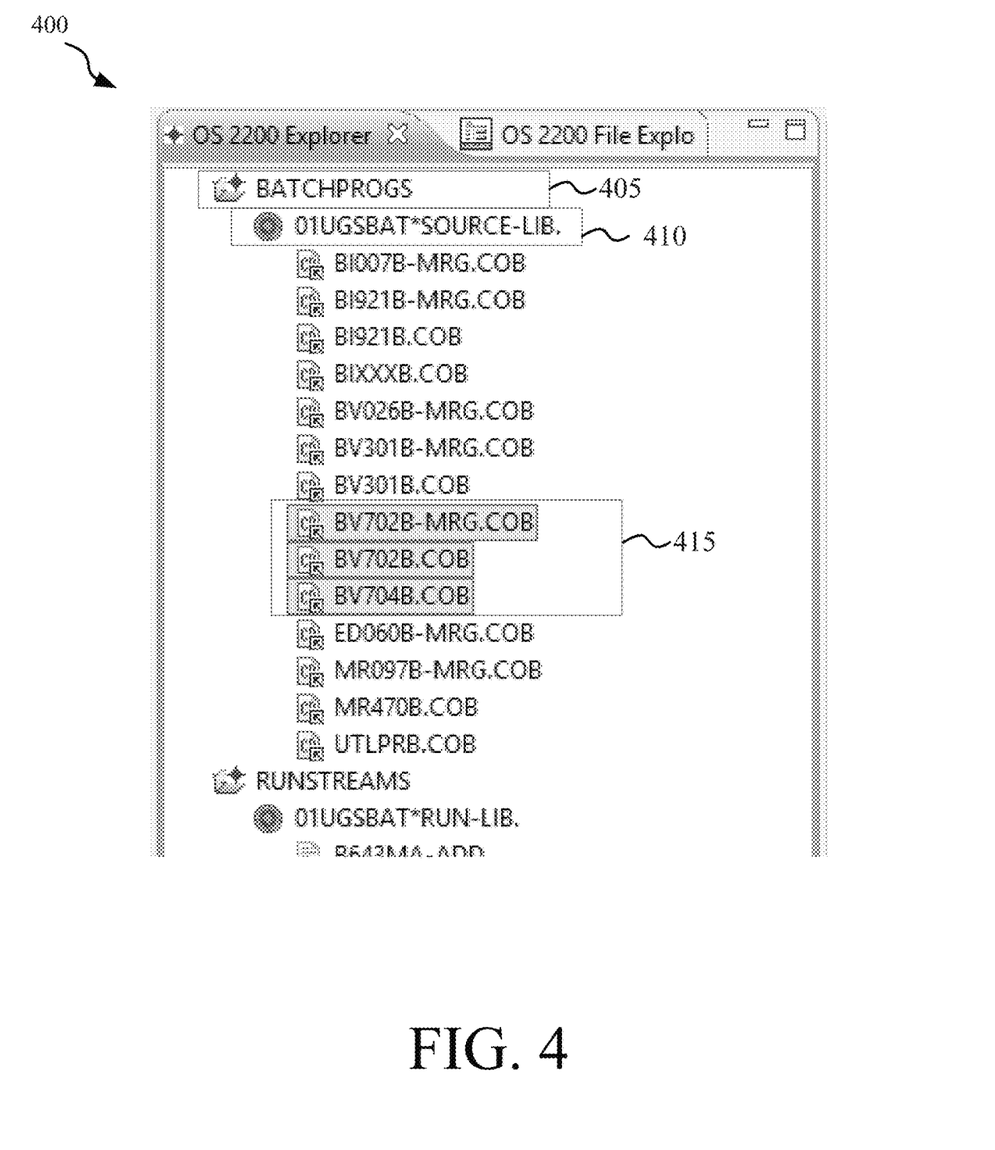
FIG. 4 is an example of a graphical user interface showing user selection of a plurality of batch programs which are received by a processor according to one embodiment of the disclosure.

FIG. 4 is an example 400 of a graphical user interface showing user selection of a plurality of batch programs which are received by a processor according to one embodiment of the disclosure. The example 400 can be a part of the method 100 shown in FIG. 1. For example, without limitation, the example 400 can be a part of step 110 shown in FIG. 1. The example 400 can be a part of the method 200 shown in FIG. 2. For example, without limitation, the example 400 can be a part of step 210 shown in FIG. 2. The example 400 can be a part of the method 300 shown in FIG. 3. For example, without limitation, the example 400 can be a part of step 310 shown in FIG. 3. The example 400 can be used in combination of the example 500 shown in FIG. 5. The example 400 can be used in combination of the example 600 shown in FIG. 6. The example 400 can be implemented in the system 700 as shown in FIG. 7. For example, without limitation, the control statements in example 400 may be stored in the data storage 706 or displayed on the user interface device 710. The example 400 can be implemented in the computer system 800 as shown in FIG. 8. For example, without limitation, the control statements in example 400 may be executed by the CPU 802 as shown in FIG. 8. The example 400 can be implemented on the servers 900 and 950 as shown in FIGS. 9A and 9B. For example, without limitation, the control statements in example 400 may be generated in the emulated environment 908 in as shown in FIG. 9A or executed by the CPU 913 as shown in FIG. 9B.

As shown in FIG. 4, example 400 includes a folder of batch programs 405. The folder of batch programs 405 includes a collection of programs 410. In one embodiment, the collection of programs 410 may also be understood by a person skill in the art as a library of programs that perform different functions. As shown in FIG. 4, the three programs 415: 01UGSBAT*SOURCE-LIB.BV702B, 01UGSBAT*SOURCE-LIB.BV702B-MRG, and 01UGSBAT*SOURCE-LIB.BV704B are selected by the user. In one embodiment, the user selected the three programs 415 to be compiled in to an executable file. In one embodiment, each selected programs may perform at least one function. In one embodiment, the compiled executable file may perform all functions of the selected programs, for example steps 120 in FIG. 1, 230 in FIG. 2, and 330 in FIG. 3.

It is noted that the file names in the example 400 shown in FIG. 4 are all exemplary and are in no way limiting the true scope of the invention which is defined by the claims and their equivalents known by the person skilled in the art.

Figure 5:
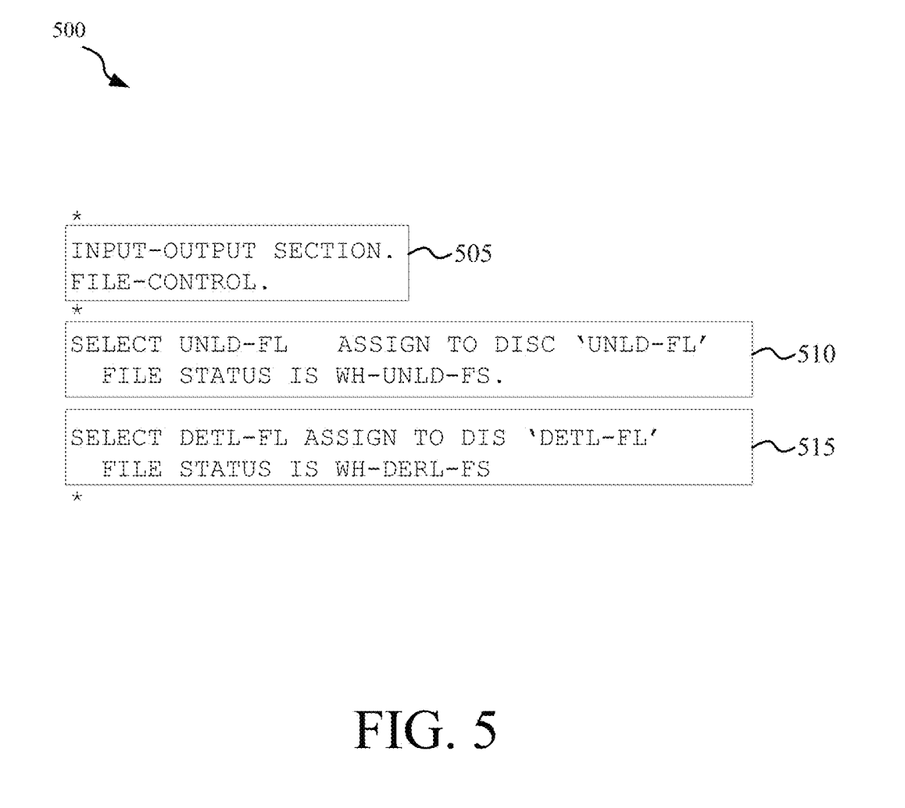
FIG. 5 is an example of parsing a program according to one embodiment of the disclosure.

FIG. 5 is an example 500 of parsing a program according to one embodiment of the disclosure. The example 500 can be a part of the method 100 shown in FIG. 1. For example, without limitation, the example 500 can be a part of step 115 shown in FIG. 1. The example 500 can be a part of the method 200 shown in FIG. 2. For example, without limitation, the example 500 can be a part of step 211 shown in FIG. 2. The example 500 can be a part of the method 300 shown in FIG. 3. For example, without limitation, the example 500 can be a part of step 325 shown in FIG. 3. The example 500 can be used in combination of the example 400 shown in FIG. 4. The example 500 can be used in combination of the example 600 shown in FIG. 6. The example 500 can be implemented in the system 700 as shown in FIG. 7. For example, without limitation, the control statements in example 500 may be stored in the data storage 706 or displayed on the user interface device 710. The example 500 can be implemented in the computer system 800 as shown in FIG. 8. For example, without limitation, the control statements in example 500 may be executed by the CPU 802 as shown in FIG. 8. The example 500 can be implemented on the servers 900 and 950 as shown in FIGS. 9A and 9B. For example, without limitation, the control statements in example 500 may be generated in the emulated environment 908 in as shown in FIG. 9A or executed by the CPU 913 ac shown in FIG. 9B.

As shown in FIG. 5, the example 500 includes the input-output section 505. In one embodiment, this input-output section 505 is included in a program coded with COBOL language.

As shown in FIG. 5, in one embodiment, the statement 510 may select and assign the file UNLD-FL as input file. In another embodiment, the statement 515 may select and assign the file DETL-FL as output file.

In one embodiment, a runstream may extract the input output information according to the information contained in the example 500. In one embodiment, the steps of parsing programs, such as 115 in FIG. 1, 211 in FIG. 2, and 325 in FIG. 3 may include example 500.

It is noted that the file names in the example 500 shown in FIG. 5 are all exemplary and do not limit the true scope of the invention which is defined by the claims and their equivalents known by the person skilled in the art.

FIG. 6 is an example 600 of control statements according to one embodiment of the disclosure. The example 600 can be a part of the method TOO shown in FIG. 1. For example, without limitation, the example 600 can be a part of steps 120 and/or 125 shown in FIG. 1. The example 600 can be a part of the method 200 shown in FIG. 2. For example, without limitation, the example 600 can be a part of steps 230 and/or 235 shown in FIG. 2. The example 600 can be a part of the method 300 shown in FIG. 3. For example, without limitation, the example 600 can be a part of steps 330 and/or 335 shown in FIG. 3. The example 600 can be used in combination of the example 400 shown in FIG. 4. The example 600 can be used in combination of the example 500 shown in FIG. 5. The example 600 can be implemented in the system 700 as shown in FIG. 7. For example, without limitation, the control statements in example 600 may be stored in the data storage 706 or displayed on the user interface device 710. The example 600 can be implemented in the computer system 800 as shown in FIG. 8. For example, without limitation, the control statements in example 600 may be executed by the CPU 802 as shown in FIG. 8. The example 600 can be implemented on the servers 900 and 950 as shown in FIGS. 9A and 9B. For example, without limitation, the control statements in example 600 may be generated in the emulated environment 908 in as shown in FIG. 9A or executed by the CPU 913 as shown in FIG. 9B.

As shown in FIG. 6, control statement 605 is a comment line. Comment line such as control commend 605 may be inserted throughout a runstream. The comments lines may help a user to have a better understanding to the functions of the runstream.

As shown in FIG. 6, control statement 610 catalogues a new breakpoint file 01UGSBAT*OBJECT-BRK-FILE. The new breakpoint file may collect all the outputs of the runstream. The new breakpoint file created by control statement 610 may be a data file that may be called by another runstream subsequently. In one embodiment, the control statement 610 may be independent from other commands in the runstream and may be a routine practice for every runstream.

As shown in FIG. 6, control statement 615 routes the output information to the catalogues breakpoint file 01UGSBAT*OBJECT-BRK-FILE, instead of the default PRINT$ file. In one embodiment, this routing of output information to a non-default file may be a routine practice for every runstream.

As shown in FIG. 6, control statement 620 deletes the object file with the specific file name 01UGSBAT*OBJECT-LIB, if there is a file with this name already exists in the system. This is to avoid repeated files with the same file name. In one embodiment, this deleting of existing file with the same file name may be a routine practice.

As shown in FIG. 6, control statement 625 catalogues the object file with the file name 01UGSBAT*OBJECT-LIB. In one embodiment, the object file 01UGSBAT*OBJECT-LIB stores all the control statements shown in FIG. 6. In another embodiment, the object file 01UGSBAT*OBJECT-LIB stores the runstream generated and compiled by methods 100, 200, and 300.

As shown in FIG. 6, control statements 630 instruct the processor to call for three programs 01UGSBAT*SOURCE-LIB.BV702B, 01UGSBAT*SOURCE-LIB.BV702B-MRG, and 01UGSBAT*SOURCE-LIB.BV704B selected by the user, for example, the three programs selected in FIG. 4.

As shown in FIG. 6, control statements 635 instruct the processor to link the three programs 01UGSBAT*OBJECT-LIB.BV702B, 01UGSBAT*OBJECT-LIB.BV702B-MRG, and 01UGSBAT*OBJECT-LIB.BV704B to form a new object module 01UGSBAT*OBJECT-LIB.20352558.

As shown in FIG. 6, the control statements 640 assign input file 01UGSBAT*DAT02 to the runstream in example 600, using the file UNLD-FL. In one embodiment, the file UNLD-FL is extracted from the example 500 shown in FIG. 5.

As shown in FIG. 6, the control statements 645 catalogue and assign the output file 01UGSBAT*DAT01, using the file DETL-FL. In one embodiment, the file DETL-FL is extracted from the example 500 shown in FIG. 5.

As shown in FIG. 6, the control statement 650 instructs the processor to execute the file 01UGSBAT*OBJECT-LIB.20352558 formed in the control statement 635. In one embodiment, executing the linked object file is a routine practice.

As shown in FIG. 6, the control statement 655 instructs the process to route the output back to the default PRINT$ file. In one embodiment, the control statement 655 is a reversal step of the control statement 615.

It is noted that the file names in the example 600 shown in FIG. 6 are all exemplary and are in no way limiting the true scope of the invention which is defined by the claims and their equivalents known by the person skilled in the art.

FIG. 7 is a block diagram illustrating a system 700 according to one embodiment of the disclosure according to one embodiment of the disclosure. FIG. 7 illustrates a system 700 for obtaining access to database files in a computing system according to one embodiment of the disclosure. The system 700 may include a server 702, a data storage device 706, a network 708, and an user interface device 710. The server 702 may also be a hypervisor-based system executing one or more guest partitions hosting operating systems with modules having server configuration information. In a further embodiment, the system 700 may include a storage controller 704, or a storage server configured to manage data communications between the data storage device 706 and the server 702 or other components in communication with the network 708. In an alternative embodiment, the storage controller 704 may be coupled to the network 708.

In one embodiment, the user interface device 710 is referred to broadly and is intended to encompass a suitable processor-based device such as a desktop computer, a laptop computer, a personal digital assistant (PDA) or tablet computer, a smartphone or other mobile communication device having access to the network 708. In a further embodiment, the user interface device 710 may access the Internet or other wide area or local area network to access a web application or web service hosted by the server 702 and may provide an user interface for enabling an user to enter or receive information.

The network 708 may facilitate communications of data between the server 702 and the user interface device 710. The network 708 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 710 accesses the server 702 through an intermediate sever (not shown). For example, in a cloud application the user interface device 710 may access an application server. The application server fulfills requests from the user interface device 710 by accessing a database management system (DBMS). In this embodiment, the user interface device 710 may be a computer or phone executing a Java application making requests to a JBOSS server executing on a Linux server, which fulfills the requests by accessing a relational database management system (RDMS) on a mainframe server.

FIG. 8 is a block diagram illustrating a computer system 800 according to one embodiment of the disclosure. FIG. 8 illustrates a computer system 800 adapted according to certain embodiments of the server 702 and/or the user interface device 710. The central processing unit ("CPU") 802 is coupled to the system bus 804. The CPU 802 may be a general purpose CPU or microprocessor, graphics processing unit ("GPU"), and/or microcontroller. The present embodiments are not restricted by the architecture of the CPU 802 so long as the CPU 802, whether directly or indirectly, supports the operations as described herein. The CPU 802 may execute the various logical instructions according to the present embodiments.

The computer system 800 may also include random access memory (RAM) 808, which may be synchronous RAM (SRAM), dynamic RAM (DRAM), synchronous dynamic RAM (SDRAM), or the like. The computer system 800 may utilize RAM 808 to store the various data structures used by a software application. The computer system 800 may also include read only memory (ROM) 806 which may be PROM, EPROM, EEPROM, optical storage, or the like. The ROM may store configuration information for booting the computer system 800. The RAM 808 and the ROM 806 hold user and system data, and both the RAM 808 and the ROM 806 may be randomly accessed.

The computer system 800 may also include an adapter 810, a communications adapter 814, an user interface adapter 816, and a display adapter 822. The I/O adapter 810 and/or the user interface adapter 816 may, in certain embodiments, enable an user to interact with the computer system 800. In a further embodiment, the display adapter 822 may display a graphical user interface (GUI) associated with a software or web-based application on a display device 824, such as a monitor or touch screen.

The I/O adapter 810 may couple one or more storage devices 812, such as one or more of a hard drive, a solid state storage device, a flash drive, a compact disc (CD) drive, a floppy disk drive, and a tape drive, to the computer system 800. According to one embodiment, the data storage 812 may be a separate server coupled to the computer system 800 through a network connection to the I/O adapter 810. The communications adapter 814 may be adapted to couple the computer system 800 to the network 708, which may be one or more of a LAN, WAN, and/or the Internet. The user interface adapter 816 couples user input devices, such as a keyboard 820, a pointing device 818, and/or a touch screen (not shown) to the computer system 800. The display adapter 822 may be driven by the CPU 802 to control the display on the display device 824. Any of the devices 802-822 may be non-emulated and/or emulated.

The applications of the present disclosure are not limited to the architecture of computer system 800. Rather the computer system 800 is provided as an example of one type of computing device that may be adapted to perform the functions of the server 702 and/or the user interface device 810. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 800 may be virtualized for access by multiple users and/or applications.

FIG. 9A is a block diagram illustrating a server 900 hosting an emulated software environment for virtualization according to one embodiment of the disclosure. An operating system 902 executing on a server 900 includes drivers for accessing hardware components, such as a networking layer 904 for accessing the communications adapter 914. The operating system 902 may be, for example, Linux or Windows. An emulated environment 908 in the operating system 902 executes a program 910, such as Communications Platform (CPComm) or Communications Platform for Open Systems (CPCommOS). The program 910 accesses the networking layer 904 of the operating system 902 through a non-emulated interface 906, such as extended network input output processor (XNIOP). The non-emulated interface 906 translates requests from the program 910 executing in the emulated environment 908 for the networking layer 904 of the operating system 902.

In another example, hardware in a computer system may be virtualized through a hypervisor. FIG. 9B is a block diagram illustrating a server 950 hosting an emulated hardware environment according to one embodiment of the disclosure. Users 952, 954, 956 may access the hardware 960 through a hypervisor 958. The hypervisor 958 may be integrated with the hardware 958 to provide virtualization of the hardware 958 without an operating system, such as in the configuration illustrated in FIG. 9A. The hypervisor 958 may provide access to the hardware 958, including the CPU 913 and the communications adaptor 914.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method to simplify creation of an executable file, comprising:
   receiving, at a processor, a plurality of programs, at least some of the received plurality of programs being coded in different programming languages, wherein each of the plurality of programs performs at least one function;
   parsing, by the processor, the plurality of programs and identifying the different programming languages used in the plurality of programs;
   linking, by the processor, the plurality of programs, including the programs coded in different programming languages, wherein the linking is done, at least partially, by:
      identifying whether each of the plurality of programs is a main program or a subprogram; and
      extracting input and/or output information from the plurality of programs; and
   generating, by the processor, control statements configured to create the executable file, the executable file being configured to perform the functions performed by the plurality of programs, including the programs coded in different programming languages, the executable file being independently executable and including a .exe file extension.

2. The method of claim 1, further comprising:
   presenting, by the processor, the control statements on an user interface device.

3. The method of claim 1, wherein the step of parsing, by the processor, the plurality of the programs includes,
   identifying, by the processor, program types of the plurality of programs.

4. The method of claim 1, wherein the programs are batch programs.

5. The method of claim 1, wherein the control statements are ECL statements.

6. A computer program product to simplify creation of an executable file, comprising:
   a non-transitory computer-readable medium comprising instructions which, when executed by a processor of a computing system, cause the processor to perform the steps of:
      receiving a plurality of programs, at least some of the received plurality of programs being coded in different programming languages, wherein each of the plurality of programs performs at least one function;
      parsing the plurality of programs and identifying the different programming languages used in the plurality of programs;
      linking the plurality of programs, including the programs coded in different programming languages, wherein the linking is done, at least partially, by:
         identifying whether each of the plurality of programs is a main program or a subprogram; and
         extracting input and output information of the first program and the second program; and
      generating control statements configured to create the executable file, the executable file being configured to perform the functions performed by the plurality of programs, including the programs coded in different programming languages, the executable file being independently executable and including a .exe file extension.

7. The computer program product of claim 6, wherein the medium further comprises instructions to cause the processor to perform the step of:

presenting the control statements on an user interface device.

8. The computer program product of claim 6, wherein the programs are batch programs.

9. The computer program product of claim 6, wherein the control statements are ECL statements.

10. An apparatus to simplify creation of an executable file, comprising:
a memory; and
a processor coupled to the memory, the processor configured to execute the steps of:
receiving a plurality of programs, at least some of the received plurality of programs being coded in different programming languages, wherein each of the plurality of programs performs at least one function;
parsing the plurality of programs;
identifying, by the processor, programming languages used in the plurality of programs;
linking the plurality of programs, including the programs coded in different programming languages, wherein the linking is done, at least partially, by:
identifying whether each of the plurality of programs is a main program or a subprogram;
and
extracting input and output information of the first program and the second program;
and
generating control statements configured to create the executable file, the executable file being configured to perform the functions performed by the plurality of programs, including the programs coded in different programming languages, the executable file being independently executable and including a .exe file extension.

11. The apparatus of claim 10, wherein the processor is further configured to perform the step of:
presenting the control statements on an user interface device.

12. The apparatus of claim 10, wherein step of parsing the plurality of programs includes
identifying program types of the plurality of programs.

13. The apparatus of claim 10, wherein the programs are batch programs.

* * * * *